United States Patent
Böhlke et al.

(10) Patent No.: US 11,939,997 B2
(45) Date of Patent: Mar. 26, 2024

(54) DEVICE FOR TRANSPORTING A MEDIUM AND ASSEMBLY METHOD

(71) Applicants: KME GERMANY GMBH & CO. KG, Osnabrück (DE); AGT-PSG GMBH & CO. KG, Steinbach (DE)

(72) Inventors: Peter Böhlke, Westerkappeln (DE); Raimund Boldt, Osnabrück (DE); Peter Daniewski, Lotte-Wersen (DE); Eduard Krämer, Wallenhorst (DE); Hans-Günther Wobker, Bramsche (DE); Gerhard Hefter, Rodgau (DE)

(73) Assignees: CUNOVA GMBH, Osnabrück (DE); AGT-PSG GMBH & CO. KG, Steinbach (DE)

( * ) Notice: Subject to any disclaimer, the term of this patent is extended or adjusted under 35 U.S.C. 154(b) by 1299 days.

(21) Appl. No.: 16/208,099

(22) Filed: Dec. 3, 2018

(65) Prior Publication Data
US 2019/0170171 A1 Jun. 6, 2019

(51) Int. Cl.
*F16L 55/00* (2006.01)
*F15D 1/02* (2006.01)
(Continued)

(52) U.S. Cl.
CPC ............... *F15D 1/02* (2013.01); *F16L 9/02* (2013.01); *F16L 9/12* (2013.01); *F16L 11/045* (2013.01);
(Continued)

(58) Field of Classification Search
CPC ..... F16L 53/38; F16L 9/02; F16L 9/12; F16L 11/127; F16L 59/143
(Continued)

(56) References Cited

U.S. PATENT DOCUMENTS 3,727,029 A * 4/1973 Chrow ............... H05B 3/56
  219/535
4,194,536 A * 3/1980 Stine ............... F16L 59/153
  392/480

(Continued)

FOREIGN PATENT DOCUMENTS

CN  1765623   5/2006
CN  107061875  8/2017
(Continued)

OTHER PUBLICATIONS

Chinese Search Report dated Oct. 22, 2021 with respect to counterpart Chinese patent Application 201811448174.9.
(Continued)

*Primary Examiner* — James F Hook
(74) *Attorney, Agent, or Firm* — Henry M. Feiereisen llc

(57) ABSTRACT

A device for transporting a medium includes at least one channel which extends in an axial direction and through which the medium is guided. The channel is enclosed by an electrically conductive inner envelope that is connected to a first potential equalization conductor. An electrically conductive outer envelope is provided between the channel and an electrically conductive outer casing and is connected to an electrically conductive second potential equalization conductor. Arranged between the channel and the outer envelope is an electrically insulating intermediate layer which is produced from heat-insulating material.

8 Claims, 2 Drawing Sheets

(51) Int. Cl.
  *F16L 9/02* (2006.01)
  *F16L 9/12* (2006.01)
  *F16L 11/04* (2006.01)
  *F16L 11/127* (2006.01)
  *F16L 53/38* (2018.01)
  *F16L 59/14* (2006.01)
  *F16L 59/153* (2006.01)
  *H05F 3/02* (2006.01)

(52) U.S. Cl.
  CPC ............ *F16L 11/127* (2013.01); *F16L 53/38* (2018.01); *F16L 59/143* (2013.01); *F16L 59/153* (2013.01); *H05F 3/02* (2013.01)

(58) Field of Classification Search
  USPC .......................... 138/104, 109, 149; 219/537
  See application file for complete search history.

(56) References Cited

U.S. PATENT DOCUMENTS

| | | | | |
|---|---|---|---|---|
| 4,229,613 A | * | 10/1980 | Braun | H01B 7/0072 |
| | | | | 138/109 |
| 4,259,989 A | * | 4/1981 | Lalikos | F16L 25/01 |
| | | | | 428/113 |
| 4,653,541 A | * | 3/1987 | Oehlschlaeger | F17D 5/04 |
| | | | | 138/104 |
| 4,667,084 A | * | 5/1987 | Regge | B05B 7/1633 |
| | | | | 392/480 |
| 4,869,293 A | * | 9/1989 | Botsolas | F16L 59/166 |
| | | | | 138/96 T |
| 5,267,670 A | * | 12/1993 | Foster | F16L 33/213 |
| | | | | 138/104 |
| 8,272,407 B2 | * | 9/2012 | Soyland | F16L 11/127 |
| | | | | 138/140 |
| 8,466,392 B2 | * | 6/2013 | O'Connor | H05B 3/56 |
| | | | | 219/544 |
| 2007/0137876 A1 | | 6/2007 | Miettinen et al. | |
| 2009/0114304 A1 | * | 5/2009 | Mohri | F16L 11/20 |
| | | | | 138/146 |
| 2016/0040830 A1 | | 2/2016 | Chow et al. | |
| 2016/0273684 A1 | | 9/2016 | Goering et al. | |

FOREIGN PATENT DOCUMENTS

| | | |
|---|---|---|
| DE | 102011018243 A1 | 10/2012 |
| DE | 102013217159 B3 | 1/2015 |
| DE | 102016002103 A1 | 8/2017 |
| EP | 2 103 856 A1 | 9/2009 |
| WO | WO 2015/014332 A2 | 2/2015 |
| WO | WO 2017/141901 | 8/2017 |

OTHER PUBLICATIONS

Translation of Chinese Search Report dated Oct. 22, 2021 with respect to counterpart Chinese patent application 201811448174.9.

* cited by examiner

DEVICE FOR TRANSPORTING A MEDIUM AND ASSEMBLY METHOD

CROSS-REFERENCES TO RELATED APPLICATIONS

This application claims the priority of German Patent Application, Serial No. 10 2017 128 760.4, filed Dec. 4, 2017, pursuant to 35 U.S.C. 119(a)-(d), the disclosure of which is incorporated herein by reference in its entirety as if fully set forth herein.

BACKGROUND OF THE INVENTION

The present invention relates to a device for transporting a medium, and to an assembly method for such a device.

The following discussion of related art is provided to assist the reader in understanding the advantages of the invention, and is not to be construed as an admission that this related art is prior art to this invention.

A device for transporting a medium can be configured for example as analysis line through which a sample of a fluid, in particular a gaseous medium, but also a powder, is conveyed from a sampling site to an analysis station for subsequent testing. Thus, the device serves as a quasi measurement line in sample gas measurements.

In potentially explosive areas or zones, e.g. spatial areas in which highly flammable gases or vapors occur, there is a risk that because of electrostatic charging of the analysis line, ignition sparks will be generated, which can lead to an explosion of the gas, vapor and/or powder mixture. Such zones are referred to as Ex areas and occur in various industrial branches and fields. To prevent electrostatic charging, when preassembled lines are involved, the analysis lines or tube bundle must be completely assembled in an ATEX-certified plant, including initial and final assembly. After assembly, the lines can no longer be cut to size on-site. In these lines, dissipative ring-well tubes are used that can dissipate the charge of the outer casing inward via a copper braid.

It would therefore be desirable and advantageous to provide an improved device for transporting a medium and improved assembly method to obviate prior art shortcomings and to enable assembly in a highly explosive area and with outer casing that sufficiently protects the line.

SUMMARY OF THE INVENTION

According to one aspect of the present invention, a device for transporting a medium includes a first potential equalization conductor, an electrically conductive inner envelope configured to enclose a channel which extends in an axial direction for passage of a medium, the inner envelope being connected to the potential equalization conductor, an outer casing configured to be electrically conductive, an electrically conductive second potential equalization conductor, an electrically conductive outer envelope provided between the channel and the outer casing and connected to the second potential equalization conductor, and an electrically insulating intermediate layer arranged between the channel and the outer envelope and produced from heat-insulating material.

The invention is based on the realization that known preassembled lines cannot be cut to size on-site. In addition to impairment of the properties of the casing itself, such a configuration generally requires pre-assembly of the device, as the beginning and end side or sample and analysis side must be sealed with end caps. This also means that the length of the line is fixed from the outset. The ring-well casing used in this case does not have a smooth surface, so that if the line is laid on sharp edges, damage to or destruction of the outer casing may occur. If such damage remains undetected, in addition to impairment of sample transport, this may also lead in potentially explosive areas to hazardous situations such as e.g. explosions. In addition, ring-well casing capable of dissipating electric charge is very thin, and therefore does not provide long-term protection against the effects of weather.

To ensure clarity, it is necessary to establish the definition of important terms and expressions that will be used throughout this disclosure. The term "conductive" within the meaning of the invention also simultaneously includes charge dissipation capacity. A substance or a material with a resistivity of greater than $10^4$ $\Omega \cdot m$ and less than $10^9$ $\Omega \cdot m$ is considered to be dissipative. According to technical guidelines, a substance or a material having an electrical resistivity $\geq 10^4$ $\Omega \cdot m$ is considered to be conductive. The invention therefore relates to an outer casing having an electrical resistivity $\geq 10^9$ $\Omega \cdot m$.

A device according to the present invention can be tailored and can find application in highly explosive areas, with an outer casing that sufficiently protects an analysis line used in IIC areas. These objectives can be achieved by using an electrically conductive envelope that is separated from the casing and simultaneously configuring the outer casing to be conductive. As a result of the potential equalization between this envelope and the earth potential, i.e. earthing of this envelope, potential differences can be prevented that could lead to the production of ignition sparks and thus to explosions. Electric charges can dissipate from the outer casing directly to the conductive envelope, which is arranged radially inside the outer casing. In this way, even major charge differences can rapidly dissipate.

According to another advantageous feature of the present invention, the outer casing can be made of thermoplastic resin with 1 to 6 wt % carbon nanotubes (CNTs). Advantageously, the conductivity of the outer casing can be achieved by adding carbon in the form of 4 to 6 wt % CNTs to a thermoplastic urethane. Higher contents of CNTs reduce electrical resistivity. The CNTs may also involve multi-wall CNTs (MWCNTs). The CNTs can also be a mixture of single-wall CNTs (SWCNTs) and MWCNTs, in particular with a predominant content of MWCNTs.

According to another advantageous feature of the present invention, an end piece and a conductive cap can be provided, with the conductive cap placed upon the end piece. Advantageously, the cap can be produced from polytetrafluoroethylene (PTFE).

According to another advantageous feature of the present invention, a conductive shrink tube can be applied to the cap and to at least one area of the outer casing to secure the cap and to conductively connect the cap to the outer casing. The shrink tube may be made of dissipative PE or dissipative PA-based adhesive and is in particular free of lead and cadmium. Because the outer casing, cap and shrink tube are composed of conductive materials, there is also high charge dissipation capacity at the assembled end.

The envelope can lie directly on the inside against the outer casing and thus be in contact therewith from inside. For manufacturing reasons, it may also be possible to provide an intermediate layer, particularly an electrically conductive layer, in particular a film, that provides additional protection between the outer casing and the outer envelope. The outer envelope can advantageously be configured as a metal foil that virtually functions as an electrostatically conductive protective screen.

A device according to the present invention can be configured as an analysis line for transporting gases, liquids and/or powder. Application in a potentially explosive area (an Ex environment according to Directive 94/9/EC) is of particularly benefit.

The potential equalization conductors or additional wires can be composed of copper (CU-ETP1), and the inner and outer envelope can be composed of aluminium, i.e. configured as radially enclosing, substantially cylindrical aluminium foil.

According to the invention, the intermediate layer is arranged between the channel and the outer envelope, with the intermediate layer being made of heat-insulating material.

In accordance with the present invention, the channel is enclosed by an electrically conductive inner envelope that is connected to a potential equalization conductor. Thus, provision is made in addition to the outer envelope, for an inner envelope for dissipating electric charges. Such a configuration is particularly advantageous in cases where electric charges may also occur in the interior of the device, e.g. in the channels or in the area of the channels. In combination therewith or alternatively thereto, the channel can also be made of electrically conductive material such as non-ferrous metal (NF metal) and be earthed via a potential equalization conductor so that electric charges can directly dissipate from the channel. When the electrically conductive channel is directly earthed, the inner electrically conductive envelope can then optionally be dispensed with.

For dissipation of an electric charge into the earth, the potential equalization conductors can be advantageously connected to an earthing system, in particular with one or a plurality of earthing rails. In this manner, formation of a potential difference of the device with respect to the earth potential is avoided, and thus the occurrence of spark discharge, which in potentially explosive areas must be avoided, as must ignition sparks inside the analysis line, which could cause the fluid to ignite. Connection of the electrically conductive components to an earthing system provides potential or charge equalization with respect to the earth potential, such that the risk of sudden and lightning-like electrical spark discharges is eliminated.

The channel or medium tube can be made of polypropylene resin or thermoplastic resin, in particular of PTFE, PFA, or PVDF. Alternatively, it can also be produced of an NF metal or a metal alloy, in particular alloy or high-alloy stainless steel. Another suitable material is titanium. The material selection depends on the medium or fluid to be transported; such metals or metallic alloys are particularly suitable in the case of chemically corrosive or chlorine-containing gases. Typical channel diameters in industrial applications range from 4 mm to 20 mm.

According to another advantageous feature of the present invention, a heating device can be arranged inside the channel for controlling a temperature of the medium. By heating the fluid, one can prevent condensation of the fluid or portions thereof during transport through the channel. This makes it possible to transport a sample to be transported in the device in its original composition to a testing device or analysis station.

Both the heating device and the channel may, advantageously, be enclosed by the inner envelope. In this way, there is direct contact between the heating device and the channel such that heat can be directly transferred to the medium. This also makes it possible to better calculate or anticipate heat generation in the channel and thus to better regulate it. This would be considerably more difficult in the case of an optionally present heat-insulating action of the inner envelope.

The heating device can be configured as a self-regulating heating device, i.e. once the device has been set or preconfigured to a desired target temperature, this temperature is maintained solely by the behavior or property of the heating device itself and without external control or regulation steps. As an alternative, a control and regulation unit can also be provided to regulate the temperature of the medium to a desired target temperature, with temperature sensors that measure the actual temperature being used for this purpose. In this case, the heating device may be configured for regulating the temperature, with a target temperature value being determined by temperature sensors and the desired temperature being adjusted using an electronic control and regulation unit by varying the intensity of the current or voltage. Advantageously, maximum and/or minimum temperatures can also be set, with the temperature not being allowed to exceed or fall below said temperatures.

The heating device can be configured as a heating band lying against the channel. Such a configuration allows heating of the fluid in the channel that is optimized to the installation space. For uniform and constant heating, the heating band may, advantageously, be arranged along the entire channel. The heating function is advantageously provided by two heat conductors configured in the heating band or the heating band element that produce heat by a charge transport when a voltage is applied. The heating band may, advantageously, be self-regulating, such that for example the properties of the material of the heating band element change depending on the temperature so as to establish a current flow to effect the desired temperature. In this case, the material of the heating band advantageously includes directly conductive polymers.

Alternatively to a heating band, the heating device can also be configured in the form of multiple heating tubes, which for example are steam-heated. Hot steam can hereby be fed through the respective heating tube, with steam at least partially transferring its heat to the fluid. Advantageously, the provision of one steam tube can be contemplated that to the extent possible lies in direct contact with all of channels.

The electrically insulating intermediate layer, which is arranged between the inner and the outer envelope, can be made of heat-insulating material. Examples of suitable materials include thermo-fleece or glass fiber fleece, or combinations thereof as well as silicone or silicone foam.

According to another aspect of the present invention, a method for tailoring a device for transporting a medium includes trimming the device in at least one location to form an end piece, sealing the end piece, placing a conductive cap over the end piece, and applying a conductive shrink tube upon the cap and to at least one area of an outer casing of the device.

In this case, the channel and/or a respective potential equalization conductor and/or a heating band may, advantageously, be guided through the cap via respective openings in the shrink tube.

The conductive shrink tube secures the cap on the casing and provides a conductive connection between the two. In this case, the shrink tube may be made of dissipative PE or dissipative PA-based adhesive, free of lead and cadmium.

Advantageously, a cap and a shrink tube on top of the cap can be shrink-fitted at each of two ends of the device, as described above.

In particular, the advantages of the invention involve a production of the dissipative outer casing from smooth material, thereby facilitating laying of the device. The outer casing can be configured to be thicker and more resistant than known ring-well casings, such that service life of the outer casing is increased and risk of ignition sparks is prevented. The device can be assembled on-site. The device allows secure placement of the outer casing on the conductive layer, such that charge dissipation can take place in a reliable manner. As all of the components used in the device are conductive, no dangerous charging can occur in initial and final assembly as well.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
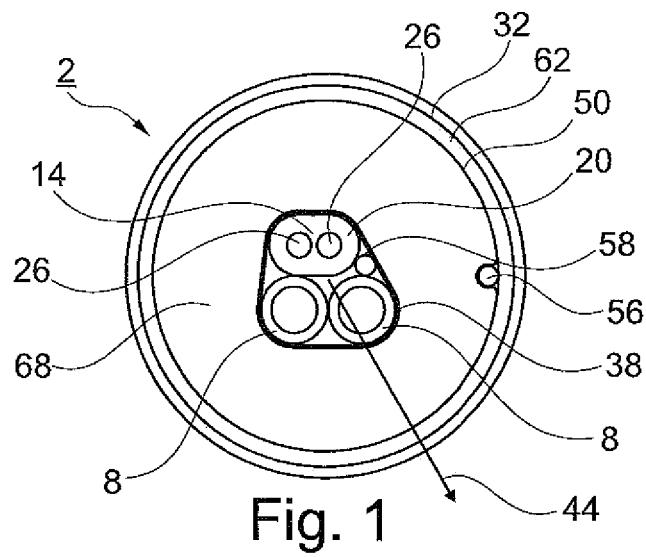
FIG. 1 is a sectional view of a device for transporting a medium in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional view of a device, generally designated by reference numeral 2, for transporting a medium in accordance with the present invention. The device 2 is configured as an analysis line and serves to transport gas samples from a sampling site to an analysis device. Distances of several hundred meters can hereby be crossed. In order to transport the gas in an axial direction or opposite to the axial direction of the device 2, two tubular channels 8 or gas conductors are provided that are composed of PE material. A heating band 14 is provided inside the channels 8 for heating of the gas. The heating band includes a heating band element 20 and two heat conductors 26 which are embedded in the heating band element 20. Currently preferred is a configuration of the heating band 14 as an electrical self-regulating heating band. The heating band element 20 is advantageously composed of conductive polymers that are mixed with conductive carbon black. The output of the heating band 14 is between 16 W/m and 64 W/m at 10° C. The current required to heat the medium depends on a length of the heating band 14.

Alternatively, a heating band can also be provided in which a temperature is regulated via a control and regulation unit. In this case, temperature sensors are mounted on the outside of the internal tube in order to determine the temperature. A maximum temperature can be limited, and the temperature is also regulated. The maximum temperature acts hereby effectively as a constraint on regulation, i.e. it ensures that the measured maximum temperature is not exceeded. In order for this temperature to correspond to the maximum temperature actually occurring, the temperature sensor(s) should be placed in the areas of highest ambient temperatures. For applications in which the temperature should not drop below a minimum level, the temperature sensor should be installed at the site with the lowest ambient temperature.

A limiter is normally set to the maximum (or minimum) allowable temperature. Two temperature sensors can also be used, with one temperature sensor being used to limit the temperature to a minimum and the other temperature sensor being used to limit the temperature to a maximum. Such a configuration is suitable for zones with sharply fluctuating ambient temperatures. The regulation process is then carried out with the proviso that the temperature should not rise above and/or drop below the maximum and/or minimum temperature.

The device 2 includes an outer casing 32 that shields the inner components from external influences, damage, stress, etc. This allows the device 2 or the analysis line to be used in potentially explosive areas, in particular IIC areas. For this purpose, the outer casing 32 or the material from which it is produced is configured to be electrically conductive or dissipative. In accordance with a non-limiting embodiment, the material of the outer casing 32 is produced from extruded thermoplastic urethane with a homogeneously distributed content of 1 to 6 wt % CNTs, in particular 4 wt % CNTs. The device 2 further has components which, particularly in combination with the conductive outer casing 32, allow effective and rapid dissipation of an electric charge, and thus prevent the occurrence of ignition sparks even in IIC areas. With a content of 2 wt % CNTs, resistance values of 100 kΩ·m or 50 kΩ·m were measured at voltages of 500 V and 1000 V.

At 4 wt % CNTs, values of 10 kΩm/5 kΩ·m are measured at 500 V/1000 V. The resistance is even lower with higher CNT content.

For this purpose, the device 2 has an inner envelope 38, which may be configured as aluminium foil. Viewed in a radial direction 4, an outer envelope 50 is provided inside the outer casing 32 and outside the inner envelope 38 and may also be configured as aluminium foil. The inner envelope 38 and the outer envelope 50 extend in the shape of a cylinder along the axial direction of the device 2. The inner envelope 38 and the outer envelope 40 are each connected via potential equalization conductors 58, 56 to an earthing system, such that the two envelopes 38, 50 have a same electrical potential, and this potential is identical to the earth potential, such that there is no potential difference with respect to the earth. Thus, when electrical charges collect on one of the two envelopes 38, 50, potential equalization with respect to the earth takes place via the potential equalization conductors 58, 56, respectively.

In this way, sparks or lightning-like electrical discharges are prevented. Such discharges might occur, for example, if electrical charges were to separate in channel 8, causing it to be electrically charged, and if no potential equalization to the outer casing 32 were to occur. In particular, the combination between the outer casing 32 and the outer envelope 50 which is connected to the outer casing 32 in an electrically conductive manner and lies radially outside the outer casing 32, allows effective and reliable dissipation of electric charges.

Provided between the outer casing 32 and the outer envelope 50 is a layer 62 which surrounds the outer envelope 50. Currently preferred is a layer 62 made of a PETP film. For production reasons, the layer 62 is provided to prevent damage to the outer envelope 50 during production of the analysis line and therefore virtually functions as a protective layer. It provides no added technical function in the non-limiting example, shown here.

Viewed in a radial direction 44, an intermediate layer 68 of thermo-fleece is arranged between the inner envelope 38 and the outer envelope 50. The intermediate layer 68 thus serves a dual purpose: It electrically insulates the two envelopes 38, 50 and it provides thermal insulation of the heated channels 8 such that energy for heating thereof can be saved. In addition, the channels 8 are shielded from external temperature influences such that the fluctuations in temperature of the fluid are reduced.

Figure 2:
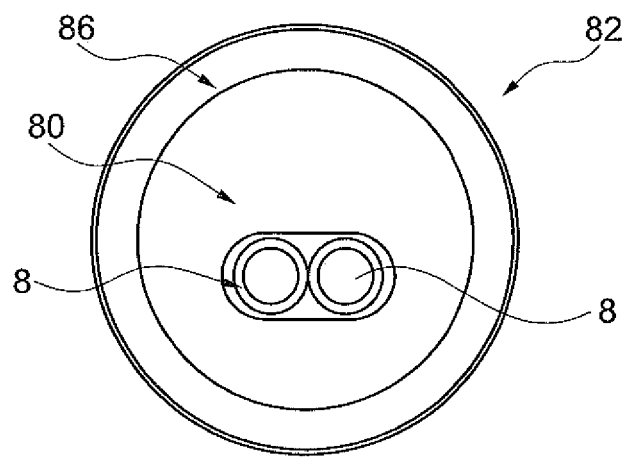
FIG. 2 is a top view of a first end of the device according to FIG. 1.

The device 2 can be assembled on-site, e.g. when it is actually being laid, i.e. the device 2 can be in particular adjusted in length. FIG. 2 shows a top view of the device 2 according to FIG. 1 at a first end 82 or beginning, which corresponds to the sample end. An end piece of the device 2 is formed at the end 82, with a cap 80 or end cap being slipped over or placed on the outer casing 32. The cap 80 is advantageously produced from PTFE. A shrink tube 86 composed of conductive material is shrink-fitted over the cap 80 and over at least one area of the outer casing 32. In this way, the end 82 or end piece is protected, and at the same time, use of conductive materials for the cap 80 and shrink tube 86 prevents formation of ignition sparks.

Figure 3:
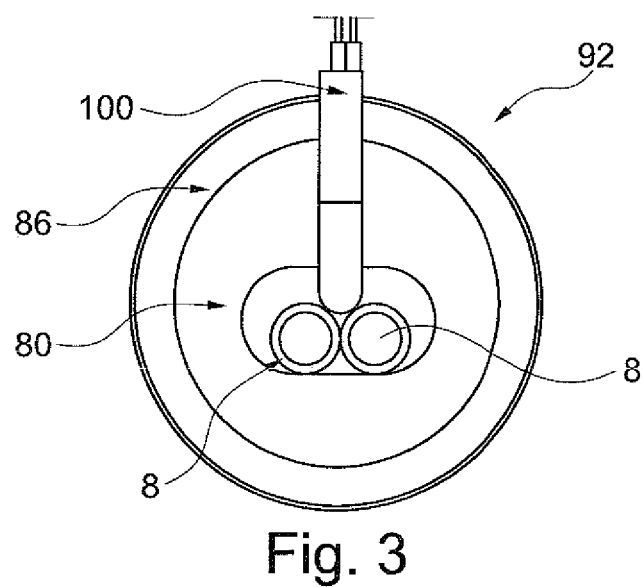
FIG. 3 is a top view of a second end of the device according to FIG. 1.

FIG. 3 shows the device 2 at a second end 92 that corresponds to the analysis end. At this end are also provided a cap 80 and a shrink tube 86, both of which are composed of electrically conductive material. Moreover, a power supply 100 is guided out from the cap 80 and shrink tube 86.

As described above, the two ends of the device 2 (sample end, analysis end) are advantageously provided with end caps. As an alternative, provision may also be made for shrinkable end caps to effect protection against penetration of moisture and dust.

Figure 4:
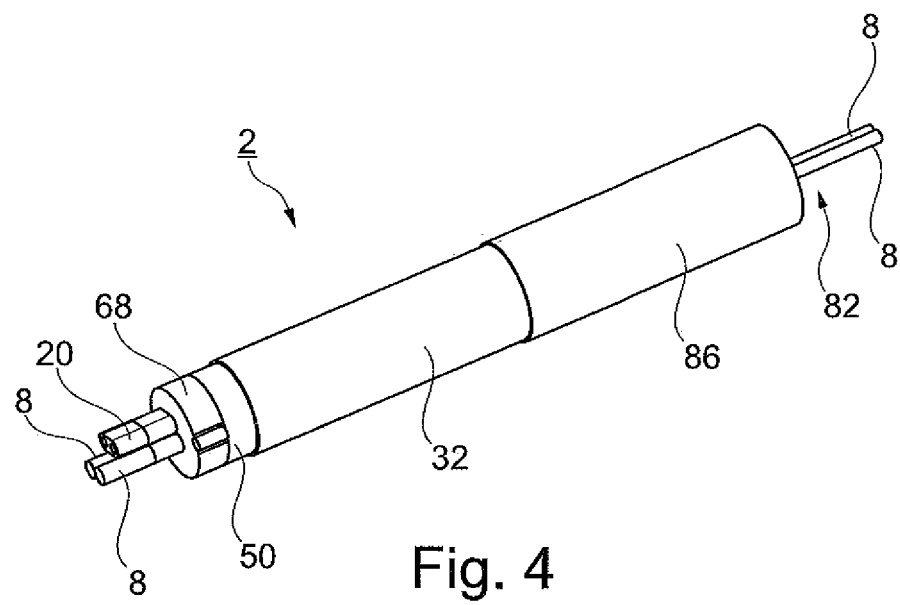
FIG. 4 a perspective view of the device according to FIG. 1 at a first end.
Figure 5:
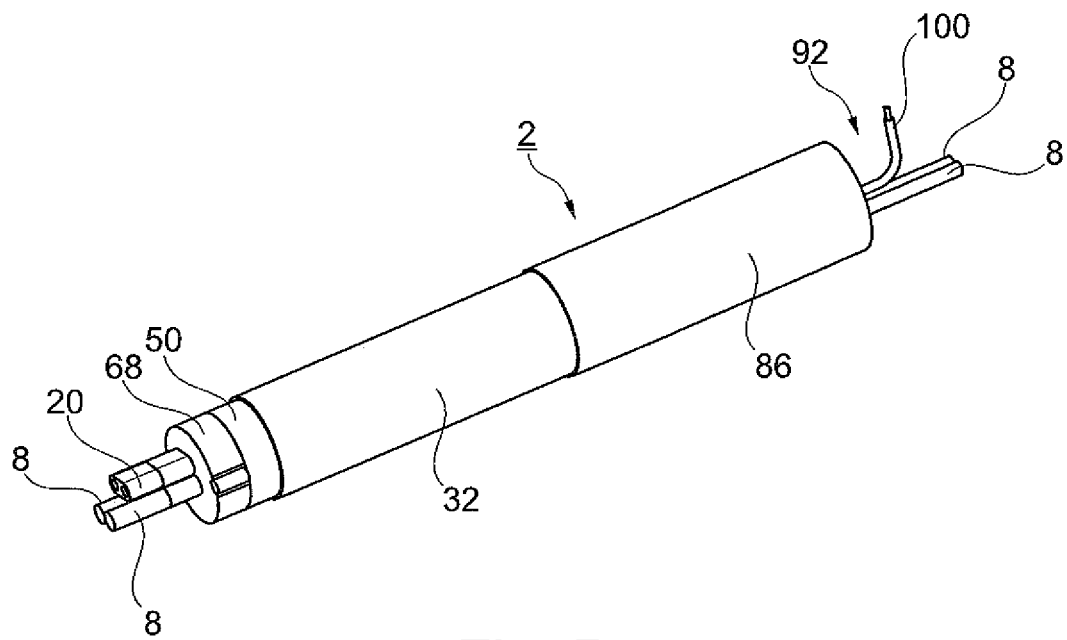
FIG. 5 a perspective view of the device according to FIG. 1 at a second end.

FIGS. 4 and 5 show perspective views of the device 2 at the first end 82 or second end 92, respectively. In the non-limiting example, shown here, the device 2 is configured as a tube bundle wound or rolled onto a cable drum, which for laying is then carefully unwound from the drum. Optionally, the analysis line is then cut off or separated from the drum. The above-described caps 80 or shrink tubes 86 are then placed or shrink-wrapped onto the two resulting ends.

Both ends must be sealed (e.g. with silicone) to protect against penetration of moisture, dust and possibly cross-contamination with explosive gases. This sealing of the ends makes the device gas-tight at the ends, thus preventing possible cross-contamination with explosive gases.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A device for transporting a medium, comprising:
a first potential equalization conductor:
an electrically conductive inner envelope configured to enclose a channel which extends in an axial direction for passage of a medium, said inner envelope being connected to the first potential equalization conductor;
an outer casing configured to be electrically conductive;
an electrically conductive second potential equalization conductor;
an electrically conductive outer envelope provided between the channel and the outer casino and connected to the second potential equalization conductor:
an electrically insulating intermediate layer arranged between the channel and the outer envelope and produced from heat-insulating material,
an end piece and an electrically conductive cap placed upon the end piece, and
an electrically conductive shrink tube applied to the electrically conductive cap and to at least one area of the outer casing to secure the cap and to electrically conductively connect the electrically conductive cap to the outer casing.

2. The device of claim 1, wherein the outer casing is made of thermoplastic resin with 1 to 6 wt % carbon nanotubes.

3. The device of claim 1, wherein the outer casing is made of 4 to 6 wt % carbon nanotubes and thermoplastic urethane.

4. The device of claim 1, wherein the electrically conductive cap is made of polytetrafluoroethylene (PTFE).

5. The device of claim 1, wherein the channel is produced from thermoplastic resin.

6. The device of claim 1, wherein the channel is produced from a metal alloy.

7. The device of claim 1, further comprising a heating device arranged inside the channel for controlling a temperature of the medium.

8. The device of claim 1, wherein the outer envelope is configured as a metal foil.

* * * * *